United States Patent [19]

Fisher

[11] Patent Number: 4,662,101

[45] Date of Patent: May 5, 1987

[54] RAT OR MOUSE TRAP

[76] Inventor: Harry L. Fisher, 9336 S. 208th St., Kent, Wash. 98031

[21] Appl. No.: 880,285

[22] Filed: Jun. 30, 1986

[51] Int. Cl.<sup>4</sup> .......................................... A01M 23/04
[52] U.S. Cl. ................................................... 43/69
[58] Field of Search ........................................ 43/69

[56] References Cited

U.S. PATENT DOCUMENTS

| 121,608 | 12/1871 | Francisco | 43/69 |
| 290,580 | 12/1883 | Harwell | 43/69 |
| 1,208,206 | 12/1916 | Poynter | 43/69 |
| 1,525,349 | 2/1925 | Yamasaki | 43/69 |

FOREIGN PATENT DOCUMENTS 81327 8/1934 Sweden ........................... 43/69

Primary Examiner—Gene P. Crosby
Attorney, Agent, or Firm—Bruce A. Kaser

[57] ABSTRACT

A mousetrap (10) is made of a pivoting platform (12) suspended over a pitfall (14). The platform (12) is balanced in a manner such that it normally assumes a horizontal position, thus giving a mouse an appearance of a stable bridge over the pitfall. When the mouse (42) steps onto the platform (12) for the purpose of obtaining bait placed thereon, however, the platform (12) spins and dumps the mouse into the pitfall thereby trapping it.

1 Claim, 5 Drawing Figures

RAT OR MOUSE TRAP

TECHNICAL FIELD

This invention relates to animal traps, and in particular, traps for rats, mice and/or similar vermin.

BACKGROUND ART

The damage caused by rats and mice to agricultural products is well known. Every year these pests cause incalculable damage to crops, whether they be in the field or stored, and other foodstuffs of a similar nature. Further, the problems associated with rat or mice infestation of domestic household environments are well known.

Man has continuously engaged in war with these pests and has engaged in various attempts at eradicating and/or controlling them. The present invention provides yet another attempt which has certain advantages over previous ones. As will become apparent, the present invention is, quite literally, the better mousetrap.

DISCLOSURE OF THE INVENTION

The present invention provides a trap for rats, mice and similar vermin. This invention employs a pit or pitfall into which these pests fall and are trapped. Once there, they may be either killed or maintained in a live condition.

A platform is suitably supported over the pitfall in a manner such that the platform can freely turn or pivot about a center line axis. The platform is balanced in a manner such that it normally assumes a horizontal position thereby giving a vermin an appearance of providing a secure supporting surface over the pitfall. The vermin can access the platform from the edge of the pitfall, and when the vermin moves onto the platform, the vermin's weight causes the platform to become unbalanced and turn, thus causing the vermin to fall into the pitfall. Of course, the vermin would be enticed onto the platform by a suitable bait placed on the platform but out of reach from the edge of the pitfall's opening.

Preferably, the pitfall is made of a bucket or another suitable container of like nature. The platform is supported over the bucket's opening by a pair of supporting members hooked to the bucket's rim. One supporting member is positioned directly across the bucket's opening from the other.

The platform comprises a generally rectangular sheet of material which spans the distance between the supporting members, with each end of the platform being pivotally connected to the end's respective adjacent supporting member. These connections are symmetrical, that is, the mid-point of each end of the rectangular platform is pivotally connected to a supporting member. This makes a pair of pivot points which define the center line axis, such axis extending generally horizontally across the bucket or pitfall's opening and about which the platform is free to turn.

The rectangular platform is curved sufficiently that its center of gravity is offset from the center line axis. Since the platform can freely turn, this causes the platform to normally assume the above-mentioned horizontal position. After the weight of a mouse or rat on the platform unbalances it, causing it to turn, the platform naturally turns back to the horizontal position after the mouse or rat falls off.

Each supporting member may have an inwardly projecting ledge from the rim or edge of the bucket or pitfall which provides vermin-access onto the platform. Swivel members are provided for making the pivotal connection between each ledge and the ends of the platform.

An advantage to the present invention is that it is effective in controlling vermin without using poison. Poison, of course, has been known to be one of the most effective methods of controlling vermin. However, it is undesirable to use poison in situations where the poison may get mixed into foodstuffs that are eventually to be consumed by humans. This invention is ideally suited for use in these kinds of situations.

Another advantage to the present invention is that it may be used as a live trap, or otherwise, if so desired. The bottom of the bucket may be filled with a few inches of water into which a mouse or rat will fall after being dumped by the platform. Eventually, the mouse or rat drowns. However, by leaving the bucket empty, they may be trapped alive.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
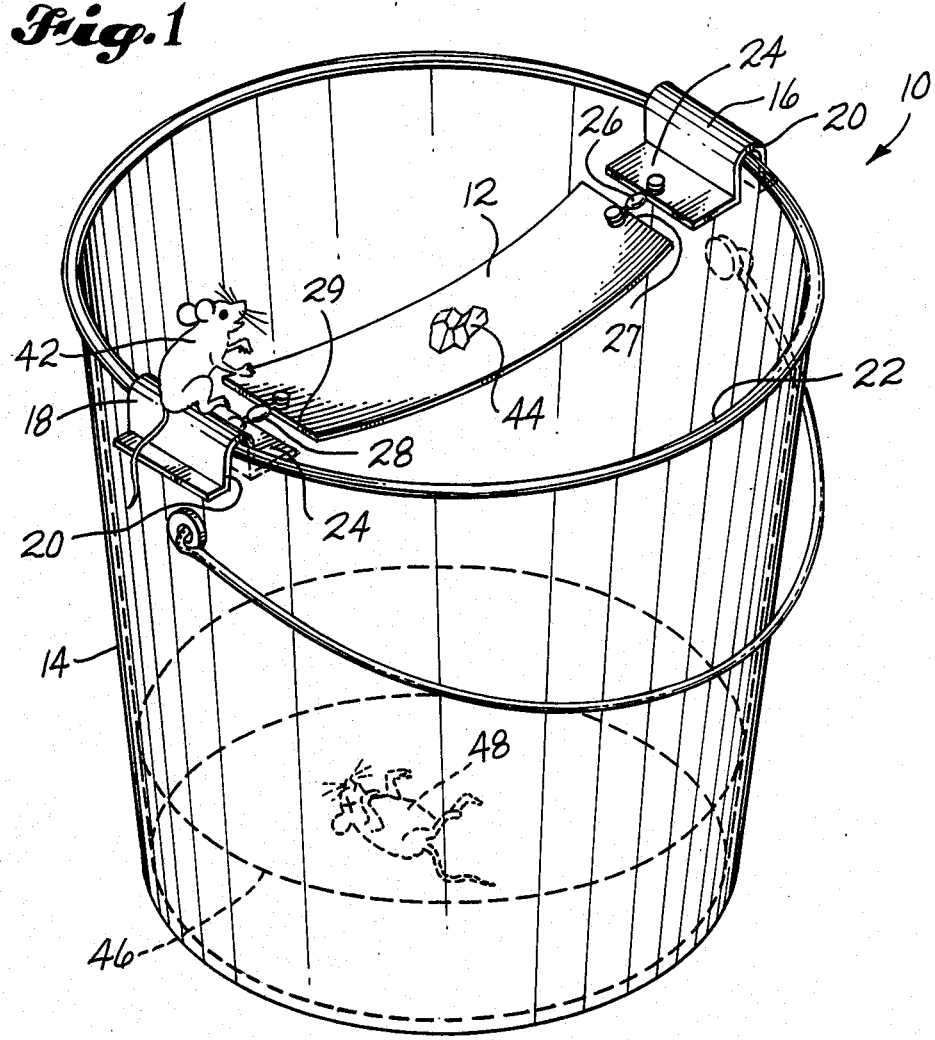
FIG. 1 is a pictorial view of a preferred embodiment of the invention, and shows a curved rectangular platform pivotally supported over the opening of a bucket.

Referring now to the drawings, and first to FIG. 1, therein is shown at 10 a preferred embodiment of the invention. The invention includes a rectangular platform 12 which is suspended over the upwardly directed opening of a bucket 14. The platform 12 is attached to the bucket 14 by a pair of supporting members 16, 18. Each supporting member has a hook portion 20 that is attached to the bucket's rim 22. Further, each member 16, 18 has an inwardly projecting ledge portion 24 that provides vermin-access from the edge of the bucket 22 onto the platform 12.

The platform 12 is pivotally connected at each of its ends 27, 29 to respective adjacent supporting members 16, 18 as shown at 26, 28. These connections are better illustrated in FIG. 2 which shows a swivel member 30 interconnecting a first member 32 and a second member 34. The swivel member 30 is connected to the two members 32, 34 by rivets 36, 38, or other suitable means, and permits the first member 32 to pivot relative to the second member 34.

Figure 3:
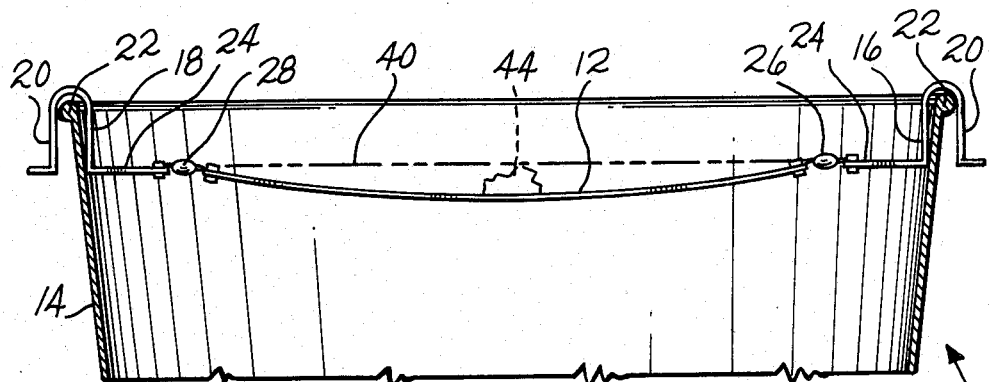
FIG. 3 is a side elevational view of the platform shown in FIG. 1.

Referring back to FIG. 3, each swivel member 26, 28 connects the approximate center point of the platform's ends 27, 29 to the supporting members 16, 18. The swivel members 26, 28 thus define two points through which a horizontal center line axis 40 passes. The platform 12 is free to turn about this axis 40 and is curved slightly so that its center of gravity is offset from the axis. This offset causes the platform 12 to be normally balanced in the horizontal position shown in FIGS. 1 and 3.

Referring again to FIG. 1, therein is shown a mouse 42 poised on the rim 22 of the bucket 14. A suitable bait 44 is positioned on the center of the platform 12 and attracts the mouse 42. It should be understood that a suitable ramp or similar structure would be provided to permit the mouse 42 to access the bucket's rim 22. This is not shown in the drawings, however. The bait 44 would, of course, be positioned on the center of the platform 12 so that its weight would not unbalance the platform.

Figure 4:
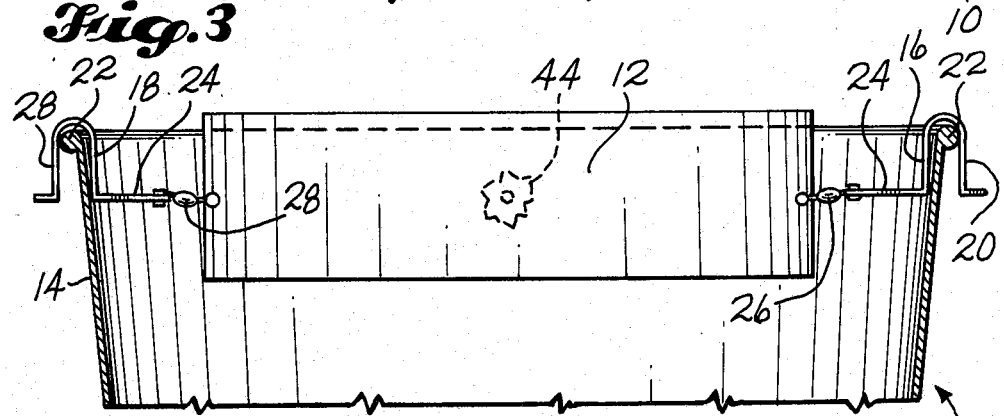
FIG. 4 is a view like FIG. 3 but shows the platform in a pivoting or turned condition.

The horizontal position of the platform 12 gives the mouse 42 the appearance that the platform provides a bridge across the opening of the bucket 14. However, when the mouse 14 steps onto the platform 12, in its desire to obtain the bait 44, the mouse's weight unbalances the platform, causing it to turn as shown in FIG. 4, and thus dumps the mouse 42 into the bucket 14. The offset center of gravity of the platform 12 then causes the platform to return to the horizontal position after the mouse falls therefrom.

It should be appreciated that the above-described curved platform 12 could be replaced by a straight platform having a suitable counterweight attached thereto. This would not be a preferred embodiment, however.

The bottom of the bucket 14 may be filled with a few inches of water as indicated by the dashed lines 46. The mouse 42 may be able to swim in the water for a certain period of time but will eventually become tired and drown as shown at 48.

Figure 2:
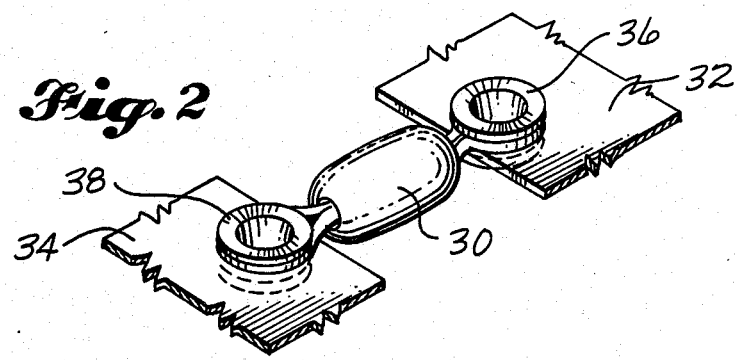
FIG. 2 is an enlarged fragmentary pictorial view showing a swivel member which connects the platform shown in FIG. 1 to a supporting member connected to the rim of the bucket.
Figure 5:
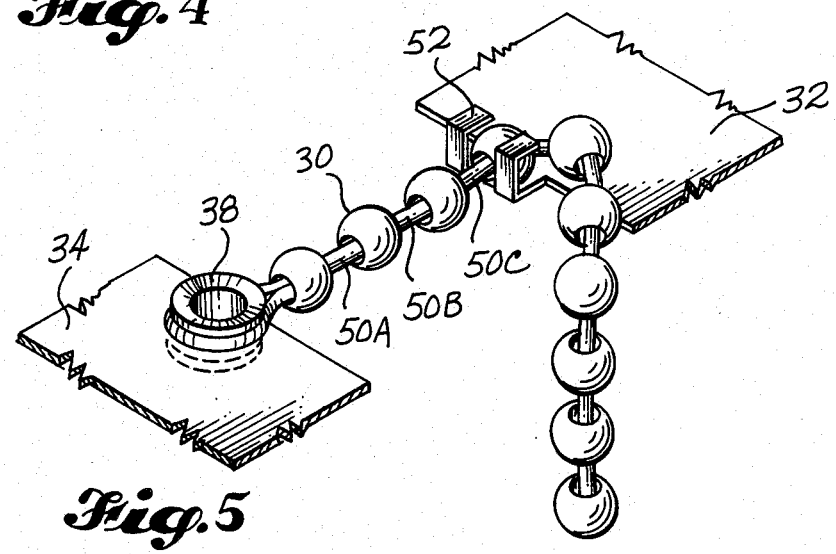
FIG. 5 is a view like FIG. 2 but shows an alternative embodiment for connecting the rectangular platform in FIGS. 1, 3 and 4 to a supporting member on the bucket's rim.

FIG. 5 shows an alternative embodiment of the swivel member 30 shown in FIG. 2. This embodiment may be used if it is desired to adapt the platform 12 to a bucket or other container having a different diameter. In this embodiment, the swivel member 30 comprises a plurality of swivel links as indicated at 50a, 50b, and 50c. The length of this alternative swivel member 30 is therefore adjustable by catching and releasing the links 50a, 50b, 50c from a link-catch 52 which is suitably connected to member 32.

The above description is presented for exemplary purposes only. This description is not meant to limit patent protection insofar as it is understood that certain departures may be taken from the above-described embodiments without departing from the overall spirit and scope of the invention. With regard to patent protection, the invention is to be limited not by the above description but only by the subjoined patent claims, in accordance with the well-established legal doctrines of patent claim interpretation.

What is claimed is:

1. A trap for mice, rats or vermin of a similar nature, and for use in connection with a pitfall having an upwardly directed opening, comprising:

a generally rectangular platform having a top surface and a bottom surface, and having a thin cross section;

a pair of platform supporting members, each of which is connected to the edge of said pitfall's opening, wherein one of said supporting members is positioned across said opening from the other, and wherein said platform substantially spans the distance between said supporting members, with a first end of said rectangular platform being pivotally connected to one of said members, and with a second end of said platform being pivotally connected to the other of said members, wherein such connections generally define a pair of points through which a center line axis extends across said pitfall's opening, said center line axis being an axis of symmetry for said platform and said platform being freely pivotably about said center line axis, and wherein said platform's cross section is curved so that said top surface is concave and said bottom surface is convex, to cause said platform's center of gravity to be slightly offset from said center line axis, and to cause said platform to normally pivot into a position where said center of gravity is positioned below said center line axis, so that said platform is balanced in a manner that said platform's top surface provides said vermin with an appearance of a bridge across said pitfall.

* * * * *